United States Patent Office 3,700,648
Patented Oct. 24, 1972

3,700,648
METHOD FOR PRODUCING ALTERNATING COPOLYMERS
Masaaki Hirooka, Ibaragi-shi, Seimei Yasui and Kentaro Mashita, Takatsuki-shi, and Fumiyuki Kimura, Ibaragi-shi, Japan, assignors to Sumitomo Chemical Company, Ltd., Osaka, Japan
No Drawing. Filed Sept. 15, 1969, Ser. No. 858,153
Claims priority, application Japan, Sept. 30, 1968, 43/70,976
Int. Cl. C08f 19/10, 15/18
U.S. Cl. 260—63 R                     13 Claims

ABSTRACT OF THE DISCLOSURE

Alternating copolymers are produced according to a process in which at least one group (A) monomer selected from a terminal unsaturated olefinic compound, an internal olefinic compound, a non-conjugated polyenic compound, an acetylenic compound and a carbonyl- or thiocarbonyl-containing non-conjugated, unsaturated compound, and at least one group (B) monomer, selected from conjugated vinyl and substituted vinyl compounds having nitrile or carbonyl groups at the position conjugated to the carbon-carbon double bond are copolymerized in the presence of a catalyst system prepared by mixing, in the presence of at least the above-mentioned group (B) monomer, a compound of a transition metal of Groups IVa, Va, VIa and VIII of the Mendeleef's Periodic Table which has at least one member selected from the group consisting of a halogen atom and alkoxy, β-diketo and acyloxy groups with an organo-aluminum or -boron halide, whereby the transition metal compound enhances the reaction carried out in the presence of an organo-aluminum or -boron halide.

This invention relates to a process for producing alternating copolymers.

The present inventors already provided specific copolymerization processes in which conjugated monomers having nitrile or carbonyl groups in the positions conjugated to the double bonds are copolymerized by use of a catalyst system containing aluminum or boron with such unsaturated compounds as olefins, halo-olefins, internal olefins, polyenes, acetylenes, unsaturated esters of carboxylic acids or N-, O- or S-containing unsaturated non-conjugated compounds to give alternating copolymers (British Pats. Nos. 1,056,236, 1,089,279, 1,107,137, 1,123,722, 1,123,723, 1,123,724, 1,123,725 and 1,137,-117, and French Pat. No. 1,528,222). The present inventors further found that when the production of this kind of alternating copolymers is effected in a system containing a compound of aluminum or boron and a certain kind of a transition metal compound, the yields of copolymers are increased and alternating copolymers can be effectively obtained. On the basis of this finding, the inventors have established the present invention.

It has already been known that vinyl compounds can be polymerized by use of a catalyst system prepared by mixing an organo-metallic compound with a transition metal compound. However, it has been recognized that polymerization reactions of polar vinyl compounds by use of coordination catalyst systems known heretofore are radical polymerization reactions and are entirely identical in characteristics with those carried out in the presence of such radical catalysts as peroxides or azo compounds. Thus, the production of alternating copolymers by use of this kind of complex catalysts has not been known heretofore.

In the present invention, the addition of a certain kind of transition metal compound can greately enhance the copolymer yield per unit amount of catalyst. Such effect is specific in that it is observed only when such specific catalyst components as disclosed in the present invention are combined with each other according to the specific procedures. It is known that a vinyl monomer such as acrylonitrile can be polymerized in the presence of the same combination of catalyst components as in the present invention. In view of the theory of copolymerization reaction, however, it is necessary for the formation of an alternating copolymer that homopolymerization of individual monomers should not substantially proceed. It is therefore considered that if it has been known that a certain catalyst system gives homopolymers, no alternating copolymers can be obtained, in principle, by use of said catalyst system. Unexpectedly, however, it has been found that under certain conditions, said catalyst combination can give alternating copolymers. The first requirement is that the combination of monomers employed should be specific, and the second requirement is that the procedures of mixing catalyst components with monomers should be limitative. The inventors have found that alternating copolymers can be selectively obtained only when the above-mentioned conditions have been satisfied.

In accordance with the present invention, there is provided a process for producing an alternating copolymer which is effected in such a manner that:

At least one group (A) monomer selected from the group consisting of:

(1) a terminal unsaturated olefinic compound having the formula,

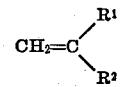

wherein $R^1$ and $R^2$ are individually a hydrogen or halogen atom, a hydrocarbon residue having 1 to 20 carbon atoms or a halogen-containing hydrocarbon residue having 1 to 20 carbon atoms, (2) an internal olefinic compound having the formula,

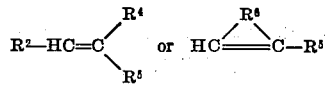

wherein $R^3$ and $R^4$ are individually a hydrocarbon residue having 1 to 20 carbon atoms or a halogen-containing hydrocarbon residue having 1 to 20 carbon atoms; $R^5$ is a hydrogen atom, a hydrocarbon residue having 1 to 20 carbon atoms or a halogen-containing hydrocarbon residue having 1 to 20 carbon atoms; and $R^6$ is a cyclic hydrocarbon residue having 1 to 20 carbon atoms or a halogen-containing cyclic hydrocarbon residue having 1 to 20 carbon atoms, (3) a non-conjugated, polyenic hydrocarbon or halogen-containing polyenic hydrocarbon compound having up to 30 carbon atoms which contains at least one carbon-carbon double bond having at least 2 hydrogen atoms,
(4) an acetylenic compound having the formula, $$R^7C\equiv CR^8$$

wherein $R^7$ is a hydrogen atom, a hydrocarbon residue having 1 to 20 carbon atoms or a halogen-containing hydrocarbon residue having 1 to 20 carbon atoms; and $R^8$ is a hydrogen atom or a polymerizable unsaturated group-containing hydrocarbon residue having 1 to 20 carbon atoms or a halogen-substituted group thereof, and (5) a carbonyl- or thiocarbonyl-containing non-conjugated, unsaturated compound having the formula, $$R^9-\underset{\underset{Z}{\|}}{C}-Y-R^{10} \text{ or } R^{11}-\overset{\overline{\phantom{XX}}}{\underset{\underset{Z}{\|}}{C}-N}-R^{10}$$

wherein $R^9$ is an $R^{12}$—, $R^{12}O$—, $R^{12}S$— or $R^{13}R^{14}N$— group; Z is an oxygen or sulfur atom; Y is an oxygen or sulfur atom or an —$NR^{15}$ group; $R^{10}$ is a polymerizable unsaturated hydrocarbon residue having 2 to 20 carbon atoms or a halogen-substituted group thereof; $R^{11}$ is a cyclic organic residue having 1 to 20 carbon atoms; $R^{12}$ being a hydrocarbon residue having 1 to 20 carbon atoms or a halogen-substituted group thereof; and $R^{13}$, $R^{14}$ and $R^{15}$ being individually a hydrocarbon residue having 1 to 20 carbon atoms or a halogen-substituted group thereof or a hydrogen atom, and At least one group (B) monomer selected from the group consisting of conjugated compounds having the formula, $$R^{I}CH=\overset{R^{II}}{\underset{}{C}}-Q$$

wherein $R^I$ and $R^{II}$ are individually a hydrocarbon residue having 1 to 20 carbon atoms, a halogen-containing hydrocarbon residue having 1 to 20 carbon atoms, or a halogen or hydrogen atom, at least one of said $R^I$ and $R^{II}$ being a hydrogen atom; and Q is a nitrile group or a group of the formula, $$-\underset{\underset{O}{\|}}{C}-Y'$$

wherein Y' is a —Z'R, —Z'Me, —NR'R'', $$-\overset{\overline{\phantom{XX}}}{N}-R^{VII}$$

or R' group or a halogen atom, Z' being an oxygen or sulfur atom; R, R' and R'' being individually a hydrogen atom or an organic residue having 1 to 20 carbon atoms; $R^{VII}$ being a divalent organic residue having 1 to 20 carbon atoms; and Me being an ammonium group or represents the monovalent portion of an element of Groups I and II of the Medeleef's Periodic Table, are contacted with a catalyst system prepared by mixing a component (a) with a component (b) in the presence of at least the above-mentioned group (B) monomer, said component (a) being:

(1) an organo-metallic halide having the formula, $$MR'''_nX_{3-n}$$

wherein M is aluminum or boron; R''' is a hydrocarbon group having 1 to 20 carbon atoms; X is a halogen atom; and n may take any value from 1 to 2, or a mixture of at least two kinds of compounds having the formulas, (i) $MR'''_nX_{3-n}$,
(ii) $M'R^{IV}_3$, and
(iii) $M''X'_3$ wherein M, M' and M'' are individually aluminum or boron; R''' and $R^{IV}$ are individually a hydrocarbon group having 1 to 20 carbon atoms; X and X' are individually a halogen atom; and n may take any value from 1 to 2, or (2) a complex of an organo-metallic halide component-coordinated conjugated compound which is obtained by mixing and contacting (i) an organic compound of a metal of Group IIb, IIIb or IVb of the Mendeleef's Periodic Table, and
(ii) a halide of a metal of Group IIIb or IVb of the Mendeleef's Periodic Table, at least one of said (i) and (ii) being a compound of aluminum or boron in the presence of the aforesaid conjugated component (B); and said component (b) being a compound of a transition metal of Group IVa, Va, VIa or VIII of the Mendeleef's Periodic Table which contains at least one member selected from the group consisting of a halogen atom and alkoxy, β-diketo and acyloxy groups. Said alternating copolymers obtained by the process of the present invention are alternating with respect to the group (A) monomer and the group (B) monomer in which the group (A) monomer and the group (B) monomer have been alternately bonded each other and the monomer belonging to one group has necessarily been bonded to the monomer belonging to the other group.

In the present process, the monomers to be copolymerized should necessarily be selected individually from the monomer groups (A) and (B). Copolymerization between monomers selected from the monomer group (A), or those selected from the monomer group (B) gives no alternating copolymer. Further, a catalyst system, which has been prepared by reacting the component (a) with the component (b) in the absence of the monomer group (B), cannot give any alternating copolymer, and it is necessary that the components (a) and (b) should be mixed with each other in the presence of at least the group (B) monomer.

In the present process, the monomers of groups (A) and (B) may individually be used either singly or in combination of two or more. In the latter case, there is obtained, regardless of the kind of monomers, a multi-copolymer in which the group (A) monomers and the group (B) monomers have been alternately bonded to each other and the monomer belonging to one group has been bonded to only the monomer belonging to the other group. In other words, the resulting multi-copolymer consists of 50 mole percent of (A) monomer units and 50 mole percent of (B) monomer units.

In the terminal unsaturated compounds of the formula $$CH_2=C\overset{R^1}{\underset{R^2}{\diagdown}}$$

which belong to group (1) of the group (A) monomers employed in the present process, the halogens represented by $R^1$ and $R^2$ are chlorine, bromine, iodine and fluorine, and the hydrocarbon residues and halogen-containing hydrocarbon residues represented by $R^1$ and $R^2$ are preferably those having alkyl, aryl, aralkyl, alkylaryl and cycloalkyl groups or halogen-substituted groups thereof.

Examples of such compounds include olefins such as ethylene, propylene, butene - 1, isobutene, hexene - 1, heptene - 1, 2 - methylbutene - 1, 2-methylpentene-1, 4-methylpentene - 1, octadecene - 1, 4 - phenylbutene - 1, styrene, α - methylstyrene, α - butylstyrene, 4 - methylstyrene, vinylcyclobutane, vinylcyclohexane, isopropenylbenzene, vinylnaphthalene and allylbenzene, and halogen-containing olefinic unsaturated compounds such as vinyl chloride, vinyl bromide, allyl chloride, allyl bromide, allyl iodide, 4 - chlorobutene - 1, 3 - chlorobutene - 1, 3 - bromopentene - 1, 4 - chlorostyrene, 4 - iodostyrene, 4 - chlorovinylcyclohexane, 4 - chloroallylbenzene, 2,4-dichlorostyrene, 2,4 - difluorostyrene, 4 - chloro-1-vinylnaphthalene, vinylidene chloride, vinylidene bromide, 2-chloropropene - 1, 1 - bromo-1-chloroethylene, 2-chloroallyl chloride, methallyl chloride and 1,1-bis(4-chlorophenyl) ethylene.

The internal olefinic compounds, which belong to group (2) of the group (A) monomers, are 1,2-di-substituted or 1,2,2-tri-substituted ethylenically unsaturated hydrocarbons or halogen-containing unsaturated hydrocarbons, as is clear from the formulas, and includes linear olefins and cyclic olefins.

Preferable compounds are, for example, those of the said formulas in which $R^3$ and $R^4$ are alkyl, aryl, aralkyl, alkylaryl and cycloalkyl groups; $R^5$ is a hydrogen atom or any one of the above-mentioned hydrocarbons; and $R^6$ is a divalent group corresponding to the above-mentioned hydrocarbon group.

As compounds of the formula

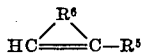

there are used not only monocyclic compounds but also common polycyclic compounds and bridged cyclic compounds.

Examples of these compounds include butene-2, 2-methylbutene - 2, hexene - 2, hexene-3, 2-methylpentene-2, heptene - 2, octadecene - 2, γ - methallyl chloride, 1,5-dichloropentene - 2, 1 - chloro - 3 - methylbutene - 2, 1 - chloromethylbutene - 2, β - methylstyrene, 4 - phenylbutene - 2, α,β - dimethylstyrene, β,β - dimethylstyrene, 1,1 - diphenylpropene - 1, stilbene, α - methylstilbene, α-methyl - 4 - chlorostyrene, α - chloromethylstyrene, α-propenylnaphthalene, 1 - cyclohexylpropene - 1, cyclopentene, cycloheptene, 1 - methylcyclobutene - 1, 4-chlorocyclohexene, indene, 2 - bromoindene, 3-methylindene, dihydronaphthalene, acenaphthylene, norbornene, 5-methylnorbornene, 5 - phenylnorbornene, 5-chloronorbornene, 5,6 - dichloronorbornene, 7 - chloronorbornene, 2-methylnorbornene, γ-fenchene, bornylene, 5 - chloromethylnorbornene, endocamphene, α-pinene and myrtenyl chloride.

As the non-conjugated polyenic compounds, which belong to group (3) of the group (A) monomers, there are shown common non-conjugated polyolefinic compounds such as dienes, trienes and tetraenes. However, the compounds should be those in which at least one of the double bonds contained therein has at least 2 hydrogen atoms. The above-mentioned polyenic compounds may not only be hydrocarbons but also be halogen-substituted compounds.

Examples of these compounds include 1,4-pentadiene, 1,4-hexadiene, 1,5-hexadiene, 11-ethyl-1, 11-tridecadiene, myrcene, 3 - fluoro - 1,4 - hexadiene, p-divinylbenzene, p - isopropenylstyrene, diallylcyclohexane, trivinylcyclohexane, 4 - vinylcyclohexene-1, 2-methallylcyclopentene-1, 3-allylindene, 4,7,8,9-tetrahydroindene, bicyclo (4,3,0) octadiene - 2,7, fulvene, 1,5 - cyclooctadiene, Δ2,2' - dicyclopentenyl, dicyclopentadiene, 2,5 - norbornadiene, 5-methylene - 2 - norbornene, 5 - vinyl - 2 - norbornene, 5 - isopropenyl - 2 - norbornene, 2 - vinyl - 1,4 - endomethylene - 1,2,3,4,5,5a,8,8a - octahydronaphthalene, limonene and dipentene.

The acetylenic compounds of the formula $R^7C\equiv CR^8$, which belong to group (4) of the group (A) monomers, are those having as $R^7$ a hydrogen atom, or a hydrocarbon group having 1 to 20 carbon atoms or a halogen-substituted group thereof. Such group includes, for example, alkyl, alkenyl, alkinyl, aryl, aralkyl, aralkylaryl, alkenylaryl, cycloalkyl, cycloalkenyl and the like saturated and unsaturated hydrocarbon groups and halogen-substituted groups thereof. $R^8$ in the formula representing the above-mentioned compounds is a hydrogen atom, or a hydrocarbon group having 1 to 20 carbon atoms or a halogen-substituted, polymerizable hydrocarbon group having 1 to 20 carbon atoms. As such groups, there may be shown, for example, groups having vinyl, vinylidene or vinylene type double bonds.

Examples of the above-mentioned compounds include acetylene, methylacetylene, ethylacetylene, 1 - hexyne, phenylacetylene, cyclohexylacetylene, vinylacetylene, divinylacetylene, hexene - 1 - in - 4, butenylmethylacetylene, allylethylacetylene, allylcyclohexylacetylene and allyl(p-chlorophenyl)-acetylene.

$R^9$ in the formula,

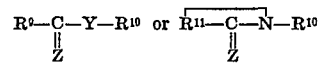

which represents the carbonyl or thiocarbonyl-containing compounds belonging to group (5) of the group (A) monomers, is such a group as $R^{12}$, $R^{12}O-$, $R^{12}S-$ or $R^{13}R^{14}N-$, where $R^{12}$, $R^{13}$ and $R^{14}$ are hydrocarbon residues, preferably alkyl, aryl, aralkyl, alkylaryl, cycloalkyl and bridged ring hydrocarbon groups and halogen-substituted groups thereof. In the formula, Y is an oxygen or sulfur atom or a group of $-NR^{15}-$, where $R^{15}$ is identical with the above-mentioned $R^{13}$ and $R^{14}$; and Z is an oxygen or sulfur atom. $R^{10}$ is a polymerizable unsaturated hydrocarbon residue having 2 to 20 carbon atoms, in which the polymerizable unsaturated bond is preferably a vinyl or vinylidene group, or, in some cases, is a vinylene group. Particularly a hydrocarbon residue containing a vinyl group is most frequently used and, in most cases, $R^{10}$ is a vinyl group itself. Alternatively, an allyl or isopropenyl group is also used frequently. As a substituent for the hydrocarbon group, a halogen is frequently used. $R^{11}$ is a cyclic organic residue having 1 to 20 carbon atoms which may contain not only a cyclic hydrocarbon but also other hetero atom, particularly an oxygen, sulfur or nitrogen atom. That is, a part of the ring may be shaped by such a form as, for example, $>C=O$, $>C=S$, $-O-$, $-S-$ or $>N-R$. Alternatively, the ring can also take the form of a polycyclic structure. In short, the non-conjugated unsaturated compounds employed in the present process are common in taking the bonding form of the type,

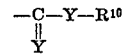

So far as the above condition is satisfied, the monomers are similar in reactivity and are not substantially affected by the forms of other portions.

Concrete kinds of these compounds are such that examples of O- or S-unsaturated compounds include unsaturated esters of carboxylic, thiolcarboxylic, thioncarboxylic and dithiocarboxylic acids, carbonates, thiolcarbonates, thioncarbonates, dithiocarbonates, trithiocarbonates, carbamates, thiolcarbamates, thioncarbamates and dithiocarbamates, and examples of N-unsaturated compounds include carboxylic acid amides, thiolcarboxylic acid amides, carbamates, thiolcarbamates, thioncarbamates, dithiocarbamates, urea compounds, thiourea compounds and N-unsaturated cyclic amide compounds. The N-unsaturated cyclic amide compounds are compounds having the formula,

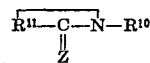

and are such compounds as, for example, lactams, dicarboxylic acid imides, dithiocarboxylic acid imides, oxazolidones and alkyleneureas.

These compounds may have been substituted by halogens or the like.

Examples of these compounds include vinyl formate, vinyl acetate, vinyl propionate, vinyl pelargonate, vinyl 2-ethyl-hexanecarboxylate, vinyl stearate, ethylvinyl oxalate, vinyl chloroacetate, vinyl thiolacetate, vinyl benzoate, vinyl cyclohexanecarboxylate, vinyl norbornane-2-carboxylate, allyl acetate, allyl laurate, allyl cyclobutanecarboxylate, 2-chloroallyl acetate, isopropenyl acetate, α- methallyl acetate, 1-propenyl acetate, 1-isobutenyl butyrate, methylvinyl carbonate, S-ethyl-O-vinyl thiolcarbonate,
O-cyclohexyl-O-vinyl thioncarbonate,
phenylvinyl trithiocarbonate,
O-vinyl-N,N-dimethylcarbamate,
S-vinyl-N,N-diethyl thiolcarbamate,
O-allyl-N,N-dimethyl thioncarbamate,
S-isopropenyl-N,N-diethyl dithiocarbamate,
N-vinylacetamide,
N-allyl-N-methylpropionic acid amide,
N-vinylbenzoic acid amide,
N-vinylthioacetamide,
N-vinylurethane (N-vinyl-O-ethylcarbamate),
N-ethyl-N-vinylmethylcarbamate,
N-vinyl-S-phenyl-thiolcarbamate,
N-vinyl-O-ethyl-thioncarbamate,
N-vinyl-N-ethyl-S-ethyldithiocarbamate,
N-vinyl-N-methyl-S-ethylthiolcarbamate,
N-ethyl-N'-vinylurea,
N,N-diethyl-N'-vinyl-N'-ethyl-urea,
N-phenyl-N'-vinylthiourea,
N-vinyl-carbamyl chloride,
N-vinyl-N-ethyl-thiocarbamyl chloride,
N-vinylpyrrolidone,
N-vinylpiperidone,
N-vinylcaprolactam,
N-vinylsuccinic acid imide,
N-vinyl-phthalimide,
N-allylsuccinic acid imide,
N-isopropenylphthalimide,
N-vinyloxazolidinone,
N-allyl-5-methyloxazolidinone,
N-vinyldiglycolimide,
N-vinylethyleneurea,
N-ethyl-N-vinylpropyleneurea, and
N-vinylethylenethiourea.

In the above, the group (A) monomers employed in the present invention have been explained in detail. When viewed from the concept of the monomer reactivity indexes Q—e of Price-Alfrey, these monomers are small in e-value, in general, and those having an e-value of 0.5 or less, particularly a minus e-value, tend to give favorable results. The Q, e-values of main monomers are disclosed in, for example, G. E. Ham: "Copolymerization," Interscience Publishers (1964).

The group (B) monomers employed in the present invention are conjugated compounds having the formula,

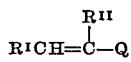

wherein Q is a nitrile group or a group of the formula

where Y' is as defined previously.

In the definition of Y', the common organic residues having 1 to 20 carbon atoms which are represented by R' and R" are preferably such hydrocarbon residues as, for example, alkyl, alkenyl, aryl, aralkyl, alkylaryl and cycloalkyl groups. Alternatively, halogen-, oxygen-, nitrogen- or sulfur-substituted groups thereof may also be used. As the halogens, there are used chlorine, bromine, iodine and fluorine. Me is the monovalent representation of an element of Groups I and II of the Mendeleef's Periodic Table. Examples of such element include lithium, sodium, potassium, rubidium, cesium, copper, silver, beryllium, calcium, strontium, barium, magnesium, zinc, cadmium and mercury. The monovalent representation referred to herein has such a meaning that when an element of Group II of the Mendeleef's Periodic Table is represented by Me', Me signifies Me'/2. That is, in the case of a divalent element, Me corresponds to

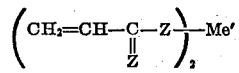

Among these, monovalent salts, i.e. salts of elements of Group I of the Periodic Table and ammonium salts are particularly preferable. The groups having the formula

are preferably those in which $R^{VII}$ is a hydrocarbon group, but halogen-, nitrogen-, oxygen- or sulfur-substituted groups may also be used. Examples of such groups are those of the formulas

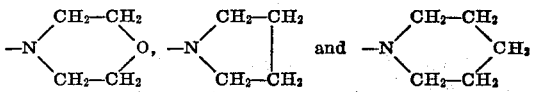

i.e. morpholino, pyrrolidino and piperidino groups.

In case both $R^I$ and $R^{II}$ in the formula representing the conjugated compounds are hydrogen atoms, the compounds are acrylonitrile or acrylic acid or thiolacrylic acid type compounds. As these compounds, there can be shown such compounds as acrylic acid esters, thiolacrylic acid esters, acrylamides, N-substituted acrylamides, N,N-disubstituted acrylamides, acrylic acid halides, acrylic acid, thiolacrylic acid, salts of said acids, acrolein and vinylketones.

In case both $R^I$ and $R^{II}$ are not hydrogen atoms, either one of them is a hydrocarbon residue, a halogen-containing hydrocarbon residue or a halogen atom. As the hydrocarbon residue, an alkyl, aryl, aralkyl, alkylaryl or cycloalkyl group is frequently used. The halogens, which are contained in the compounds or which are used for substitution, are chlorine, bromine, iodine and fluorine. That is, these compounds are α- or β-substituted compounds of the aforesaid acrylonitrile or acrylic or thiolacrylic acid type compounds.

Examples of these compounds include methyl acrylate, ethyl acrylate, n-butyl acrylate, n-amyl acrylate, 2'-ethylhexyl acrylate, octadecyl acrylate, allyl acrylate, O-toluyl acrylate, benzyl acrylate, cyclohexyl acrylate, 2-chloroethyl acrylate, β-chloroallyl acrylate, methyl thiolacrylate, ethyl thiolacrylate, acrylamide, N-methylacrylamide, N-n-butylacrylamide, N-2-ethylhexylacrylamide, N-stearylacrylamide, N-cyclohexylacrylamide, N-toluylacrylamide, N,N-dimethylacrylamide, N - methyl-N-ethylacrylamide, acrylyl-morpholine, acryl pyrrolidine, acrylic acid chloride, acrylic acid bromide, acrylic acid, thiolacrylic acid, sodium acrylate, potassium acrylate, zinc acrylate, ammonium acrylate, acrolein, methyl vinyl ketone, ethyl vinyl ketone and phenyl vinyl ketone. Further, examples of α- or β-substituted conjugated vinyl compounds include methyl methacrylate, ethyl methacrylate, butyl methacrylate, benzyl methacrylate, phenyl methacrylate, toluyl methacrylate, cyclohexyl methacrylate, 2-chloroethyl methacrylate, methyl thiolmethacrylate, ethyl thiolmethacrylate, methyl α-ethylacrylate, ethyl α-butylacrylate, methyl α-cyclohexylacrylate, methyl α-phenylacrylate, methyl α-chloroacrylate, methyl α-bromoacrylate, methyl α-chloromethylacrylate, methyl α-(p-chlorophenyl) acrylate, methacrylamide, N-ethylmethacrylamide, N-cyclohexylmethacrylamide, N,N - dimethylmethacrylamide, methacrylyl piperidine, α-ethylacrylamide, α-chloroacrylamide, α-chloromethylacrylamide, methacrylic acid chloride, α-chloroacrylic acid chloride, α-ethylmethacrylic acid chloride, methacrylic acid, thiolmethacrylic acid, sodium methacrylate, zinc methacrylate, ammonium α-fluoroacrylate, methacrolein, methylisopropenylketone, 1-chlorobutenylketone, methacrylonitrile, α-ethylacrylonitrile, α-cyclohexylacrylonitrile, α-chloroacrylonitrile, α-chloromethylacrylonitrile, ethyl crotonate, phenyl crotonate, crotonamide, crotonic acid chloride, crotonitrile, methyl cinnamate, butyl cinnamate, chloromethyl cinnamate, nitrile cinnamate, methyl β-ethylacrylate and methyl β-chlormethylacrylate.

In the catalyst component (a) employed in the present process, preferable aluminum or boron compounds having the formula MR'''$_n$X$_{3-n}$, M'R$^{IV}_3$ or M''X'$_3$ are those in which R''' and R$^{IV}$ are, for example, alkyl, alkenyl, aryl, aralkyl, alkylaryl and cycloalkyl groups. Examples of such groups include methyl, ethyl, propyl, butyl, hexyl, octyl, decyl, dodecyl, stearyl, phenyl, toluyl, naphthyl, benzyl, cyclopentadienyl and cyclohexyl groups. As X and X', there are used chlorine, bromine, iodine and fluorine.

Examples of the compounds having the formula

MR'''$_n$X$_{3-n}$ include methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum diiodide, allylaluminum dichloride, ethylaluminum sesquichloride, ethylaluminum sesquibromide, ethylaluminum sesquifluoride, methylaluminum sesquichloride, diethylaluminum chloride, diethylaluminum fluoride, ethylphenylaluminum chloride, dicyclohexylaluminum chloride, methylboron dichloride, ethylboron dichloride, ethylboron diiodide, butylboron dichloride, hexylboron dichloride, dodecylboron dichloride, phenylboron dichloride, benzylboron dichloride, cyclohexylboron dichloride, diethylboron bromide, dipropylboron chloride, dibutylboron chloride, dihexylboron chloride, ethylvinylboron chloride and dicyclopentadienylboron chloride. Examples of the compounds having the formula M'R$^{IV}_3$ include trimethylaluminum, triethylaluminum, tripropylaluminum, tributylaluminum, trihexylaluminum, tridecylaluminum, triphenylaluminum, tricyclohexylaluminum, tribenzylaluminum, trimethylboron, triethylboron, tributylboron, trihexylboron, diethylphenylboron, diethyl-p-toluylboron and tricyclohexylboron. Examples of the compounds having the formula M''X'$_3$ include aluminum trichloride, aluminum tribromide, aluminum triiodide, partial fluoride of aluminum chloride, boron trichloride, boron trifluoride, boron tribromide and boron triiodide.

The organic compound of a metal of Group IIb, IIIb or IVb of the Mendeleef's Periodic Table, which is used in the catalyst component (2) of the present invention, is an organo-metallic compound containing, as the metal component, zinc, cadmium, mercury, boron, aluminum, gallium, indium, thallium, germanium, tin or lead. Particularly, such metal components as zinc, boron, aluminum and tin are frequently used. Preferable organic groups are hydrocarbon groups. Particularly, those having alkyl, alkenyl, aryl, aralkyl, alkylaryl and cycloalkyl groups are effective. The metals are used also in the cases where the compounds have other groups in addition to the organic groups. Particularly useful organo-metallic compounds are those having the formula, M'''R$^V_n$X''$_{p-n}$ wherein M''' is a metal of Group IIb, IIIb or IVb of the Mendeleef's Periodic Table; R$^V$ is a hydrocarbon group having 1 to 20 carbon atoms; X'' is a halogen; p is the valency of said metal; and n is an arbitrary value from 1 to p. The compounds are particularly effective, when n=p, i.e. MR$_p^V$.

Examples of these organo-metallic compounds include diethylzinc, ethylzinc chloride, diethylcadmium, diethylmercury, diphenylmercury, triethylboron, tributylboron, tricyclohexylboron, ethylboron bromide, tiethylaluminum, tributylaluminum, trihexylaluminum, tricyclohexylaluminum, vinyldiethylaluminum, diethylaluminum chloride, ethylaluminum sesquichloride, ethylaluminum dichloride, trimethylgallium, triethylgallium, triethylindium, tetraethylgermanium, tetramethyltin, tetraethyltin, tetraisobutyltin, dimethyldiethyltin, tetraphenyltin, tetrabenzyltin, diethyldiphenyltin, triethyltin chloride, diethyltin dichloride, ethyltin trichloride, tetramethyllead, tetraethyllead, dimethyldiethyllead and triethyllead chlorides.

On the other hand, the metal halide employed in the catalyst component (2) of the present invention is a halide of a metal of Group IIIb or IVb of the Mendeleef's Periodic Table, e.g. a halide of boron, aluminum, gallium, indium, thallium, germanium, tin or lead. As such metal halides, those containing other groups than halogens may also be used. In the present invention, particularly preferabe metal halides are compounds having the formula, M$^{IV}$X'''$_m$R$^{VI}_{q-m}$ wherein M$^{IV}$ is a metal of Group IIIb or IVb of the Mendeleef's Periodic Table; X''' is a halogen; R$^{VI}$ is a hydrocarbon group having 1 to 20 carbon atoms; q is the valency of said metal; and m is an arbitrary value of 1 to q. Generally, favorable results are liable to be obtained when m=q, i.e. M$^{IV}$X'''$_q$.

Examples of metal halides useful in the present invention include boron trichloride, boron trifluoride, boron tribromide, boron triiodide, ethylboron dichloride, diethylboron chloride, aluminum trichloride, aluminum tribromide, aluminum triiodide, partial fluoride of aluminum chloride, ethylaluminum dichloride, methylaluminum dibromide, ethylaluminum sesquichloride, diethylaluminum chloride, potassium trichloride, gallium dichloride, germanium tetrachloride, tin tetrachloride, tin tetrabromide, tin tetraiodide, ethyltin trichloride, methyltin trichloride, phenyltin trichloride, dimethyltin dibromide, diethyltin dichloride, diisobutyltin dichloride, triethyltin chloride, lead tetrachloride and diethyllead dichloride.

In case the combination of an organic compound of a metal of Group IIb, IIIb, or IVb of the Mendeleef's Periodic Table and a halide of a metal of Group IIIb or IVb of the Mendeleef's Periodic Table is used as the catalyst component (2), the organo-metallic compound and the metal halide are used without mixing them previously. The mixing of these components is effected in the presence of at least a conjugated vinyl compound. Favorable results are liable to be obtained particularly when the conjugated vinyl compound and the metal halide are previously mixed with each other and then the organo-metallic compound is added to the mixture.

The compound of a transition metal of Group IVa, Va, VIa, or VIII of the Mendeleef's Periodic Table, which is used in the present process, is a compound containing at least one member selected from the group consisting of a halogen atom and alkoxy, β-diketo and acyloxy groups. These groups, i.e. alkoxy, β-diketo and acyloxy groups, have, respectively, the formulas

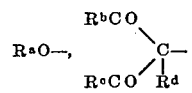

and R$^e$COO—, wherein R$^a$, R$^b$, R$^c$, R$^d$ and R$^e$ are individually a hydrocarbon residue. The halogens are preferably chlorine, bromine and iodine. The β-diketo groups are preferably acylacetonyl groups, particularly acetylacetonyl and benzoylacetonyl groups. The hydrocarbon residues in the above-mentioned groups may be any of those having, for example, alkyl, aryl, aralkyl, alkylaryl and cycloalkyl groups, and, particularly, groups having 1 to 20 carbon atoms are preferable. Examples of the transition metal of Group IVa, Va, VIa and VIII of the Mendeleef's Periodic Table are titanium, zirconium, vanadium, chromium, molybdenum, tungsten, iron, cobalt, nickel, palladium, rhodium and platinum. Among these, titanium, zirconium, vanadium, chromium, iron, cobalt and nickel are preferable, and particularly, the use of vanadium and cobalt gives favorable results. These transition metal compounds may adequately have at least one member selected from the group consisting of halogens and alkoxy, β-diketo and acyloxy groups. Alternatively, those containing said groups in admixture of two or more or in combination with other groups may also be used.

Examples of these compounds include titanium tetrachloride, titanium trichloride, di-n-ethoxytitanium dichloride, n-butyl orthotitanate, dititanium diacetylacetonate hexachloride, dicyclopentadienyltitanium dichloride, zirconium tetrachloride, zirconium tetraacetylacetonate, vanadium tetrachloride, vanadyl trichloride, triethyl orthovanadate, vanadylethoxy dichloride, vanadyldiamyloxy monochloride, vanadium trisacetylacetonate, vanadium trisbenzoylacetonate, vanadyl diacetylacetonate, vanadyl acetylacetonate dichloride, dicyclopentadienylvanadium dibromide, vanadium acetate, vanadium stearate, chromium trichloride, chromium trisacetylacetonate, iron trichloride, iron trisacetylacetonate, cobalt dichloride, cobalt trisacetylacetonate, cobalt naphthenate, cobalt stearate, nickel dichloride, nickel diacetylacetonate and nickel stearate.

Among these, a particularly preferably combination as catalyst component is the combination of an alkylaluminum halide and a vanadium compound having at least one member selected from the group consisting of a halogen and alkoxy and acylacetonyl groups, or a combination of an alkylboron halide and a cobalt trisacetylacetonate.

In practicing the present process, the concentrations and proportions of catalyst components are widely variable depending on the kind of monomers and other conditions. Generally, however, the catalyst according to the present invention is high in activity, as compared with the case of conventional alternating copolymerization where no transition metal compound is used, and hence may be used in a small proportion. The aluminum or boron compound is frequently used as a catalyst component (a) in a proportion of 0.001–1 mole, particularly preferably 0.005–0.5 mole, per mole of the group (B) compound. By use of the transition metal compound in accordance with the present invention, the copolymer yield per catalyst is considerably enhanced and if suitable conditions are selected, the group (B) conjugated compound can be copolymerized in a proportion of 1 mole or more, particularly 2–500 moles or more, per mole of the aluminum or boron compound.

According to the present process, a copolymer sufficiently high in alternation regularity can be obtained. However, a sufficient consideration is required in the case where both of the group (A) and (B) monomers are copolymerized under such conditions that the monomers are radical-polymerized by a catalyst system obtained from the components (a) and (b). That is, under such conditions that the amount of the catalyst based on the group (B) monomer is small, there are some cases where alternation regularity is disturbed. In such cases, therefore, the temperature is lowered or other conditions are suitably employed so as to select such conditions that at least one of the group (A) and (B) monomers does not show any polymerizability at all, or the catalyst component (a) is used in a relatively large amount or the amount of the catalyst component (b) is decreased, whereby the alternation can be maintained. In order to maintain the alternating regulation accurately, it is necessary to use the catalyst component (a) in an equimolar amount to the group (B) monomer, or to effect the copolymerization under at least such conditions that neither of the group (A) and (B) monomers are homopolymerized. For example, it is desirable to use the aluminum or boron compound in an amount sufficient to bring about no homopolymerization of the group (B) monomer.

The components (2) of the catalyst component (a) are used in admixture in the presence of the group (B) conjugated compound, like in the case of the conventional alternating copolymerization process. However, the transition metal compound may be simultaneously mixed or may be added later to the polymerization system.

The ratio of the component (b) to the component (a) is concerned with the activity of the resulting catalyst. Generally, the component (b) is used in a proportion of 0.001–10 moles per mole of the component (a). Particularly when the component (b) is used in a proportion of 0.01–1 mole, favorable results are obtained. The components (a) and (b) are mixed with each other in the presence of at least the group (B) monomer, but the time of addition of the group (A) monomer is optional.

In practicing the present process, a suitable amount of oxygen or an organic peroxide may be added. By addition of said compound, the copolymerization reaction can be promoted, but the addition thereof in excess amount disturbs the reaction. Generally, oxygen or an organic peroxide is added in an amount smaller than the amount of catalyst employed, whereby favorable results are obtained. For example, said compound is used in a proportion of 0.01–100 mole percent based on the amount of catalyst. Organic peroxides usable in the present invention are common organic compounds having peroxide bonds, such as for example, diacyl peroxides, ketone peroxides, aldehyde peroxides, ether peroxides, hydroperoxides, dihydrocarbyl peroxides, peracid esters, dihydrocarbyl percarbonates and percarbamates. Concrete examples thereof include benzoyl peroxide, lauroyl peroxide, acetyl peroxide, methylethylketone peroxide, t-butyl hydroperoxide, cumene hydroperoxide, di-t-butyl peroxide, dicumyl peroxide, t-butyl perbenzoate, t-butyl peracetate and phenyl percarbamate. Generally, those high in radical decomposition rate are effective.

In the present invention, the polymerization temperature can be selected from the range of such a low temperature as −150° C. to such a high temperature as +100° C. Generally, however, a temperature of from −80° C. to +70° C., particularly from −40° C. to +40° C., is preferable. The pressure of the polymerization system may be an arbitrary pressure ranging from reduced pressure or a state diluted with an inert gas to a pressure of 100 kg./cm.$^2$.

In the practice of the present process, bulk-polymerization may be effected in a liquid monomer. Alternatively, the polymerization may be carried out in a common inert solvent. Examples of such solvents are general hydrocarbons and halogen-containing hydrocarbon compounds, including propane, butane, pentane, hexane, heptane, octane, ligroin, petroleum ether, other petroleum type mixed solvents, benzene, toluene, xylene, cyclohexane, methylcyclohexane, methylene dichloride, ethylene dichloride, trichloroethylene, tetrachloroethylene, butyl chloride, chlorobenzene and bromobenzene. Compounds which form stable complexes with the catalyst components are not desirable as solvents.

After completion of the polymerization reaction, aftertreatments are effected according to ordinary processes to purify and recover the polymerization resultant. As these processes, there are optionally adopted, for example, alcohol treatment, alcohol-hydrochloric acid treatment, hydrochloric acid-water treatment, alkali treatment, etc., and conventional after-treatment processes employed in cation polymerization using Lewis acids or in polymerization using Ziegler-Natta type catalysts. Alternatively, there may be adopted a process in which the catalyst component is not separated from the polymerization resultant but a compound capable of forming a complex therewith is added, thereby separating and recovering the catalyst component.

The present invention will be illustrated in further detail below, but the invention is not limited to these examples.

EXAMPLE 1

A 200 ml. four-necked flask was flushed with nitrogen and was placed in a thermostat at 0° C. To the flask were added with stirring 35 ml. of toluene, 18 ml. of methyl acrylate, 25 ml. of styrene, 10 mmol. of ethylaluminum sesquichloride (AlEt$_{1.5}$Cl$_{1.5}$) and 2.5 mmol. of vanadyl trichloride in this order. After 18 hours, methanol was charged into the flask to cease the reaction, and the coagulates were washed with methanol and dried overnight in vacuum at 40° C. to obtain 37.4 g. of a copolymer. The infrared absorption spectrum of the copolymer was entirely identical with that of an alternating copolymer obtained without the addition of vanadyl trichloride. The elementary analysis values thereof were C: 76.45% and H: 8.01% and well coincided with the calculated values C: 75.79% and H: 7.37% as an alternating copolymer.

EXAMPLE 2

Example 1 was repeated, except that 21.4 ml. of methyl methacrylate was used in place of the methyl acrylate, to obtain 28.3 g. of a copolymer. The copolymer was dissolved in deuterochloroform to form a 10% solution and was then subjected to nuclear magnetic resonance analysis at 100 megacycles to obtain the spectrum entirely identical with that of an alternating copolymer prepared without the addition of vanadyl trichloride. The resonance spectrum was clearly distinguished from that of 1:1 radical copolymer.

EXAMPLE 3

Example 1 was repeated, except that 13.2 ml. of acrylonitrile was used in place of the methyl acrylate, to obtain 19.6 g. of an alternating copolymer.

EXAMPLE 4

A 300 ml. glass reactor equipped with a stirrer was placed in a thermostat at 0° C. and was flushed with nitrogen. Thereafter, 20 ml. of vinyl acetate, 20 ml. of methyl acrylate, 35 ml. of toluene, 10 mmol. of ethylaluminum sesquichloride and 2.5 mmol. of vanadyl trichloride were added in this order to the reactor, and the mixture was polymerized for 5 hours to obtain 15.3 g. of a copolymer.

EXAMPLE 5

A 50 ml., graduated glass reaction tube was flushed with nitrogen and was then cooled to —78° C. in a Dry Ice-methanol bath. In the reaction tube, 10 ml. of vinyl chloride was liquefied, and the tube was transferred to a thermostat at —25° C. Subsequently, 1.8 ml. of methyl acrylate, 2 mmol. of ethylaluminum sesquichloride and 0.5 mmol. of vanadyl trichloride were added in this order to the reaction tube, and the mixture was reacted for 3 hours to obtain 1.2 g. of a copolymer.

EXAMPLE 6

Example 5 was repeated, except that 1.3 ml. of acrylonitrile was used in place of the methyl acrylate, to obtain 0.3 g. of a copolymer. The elementary analysis values of the copolymer were C: 52.51%, H: 5.49% and N: 12.97%, and well coincided with the calculated values C: 51.97%, H: 5.20% and N: 12.12% as a 1:1 alternating copolymer.

EXAMPLE 7

In a 300 ml. glass autoclave equipped with a stirrer, 15 ml. of propylene was liquefied. Subsequently, 35 ml. of toluene, 20 ml. of acrylonitrile, 10 mmol. of ethylaluminum sesquichloride and 2.5 mmol. of vanadyl trichloride were added in this order to the reactor at —20° C., and the mixture was polymerized for 4 hours to obtain 1.23 g. of a copolymer.

EXAMPLE 8

Example 7 was repeated, except that 17 ml. of isobutylene was used in place of the propylene and 18 ml. of methyl acrylate was used in place of the acrylonitrile, to obtain 10.2 g. of a copolymer. The elementary analysis values of the copolymer were C: 67.17% and H: 9.82% and well coincided with the calculated values C: 67.56% and H: 9.94% as a 1:1 alternating copolymer. Further, the intrinsic viscosity of the copolymer was 0.35 dl./g. as measured in benzene solution at 30° C.

EXAMPLE 9

A 50 ml. glass reaction tube was flushed with nitrogen. To the tube were added at —20° C., 15 ml. of styrene, 1.3 ml. of acrolein, 2 mmol. of diethylaluminum chloride and 0.5 mmol. of vanadium tetrachloride in this order, and the mixture was reacted for 10 hours to obtain 1.25 g. of a copolymer.

EXAMPLE 10

A 200 ml. four-necked flask was flushed with nitrogen and was placed in a thermostat at —20° C. To the flask were added 467 mmol. of styrene, 200 mmol. of methyl acrylate, 2 mmol. of ethylboron dichloride and 0.5 mmol. of cobalt trisacetylacetonate in this order, and the mixture was reacted for 4 hours to obtain 11.8 g. of a copolymer. The intrinsic viscosity of the copolymer was 2.07 dl./g. as measured in benzene solution at 30° C. Further, the elementary analysis values of the copolymer were C: 75.22% and H: 7.38% and well coincided with the calculated values C: 75.76% and H: 7.42% as a 1:1 alternating copolymer.

EXAMPLE 11

A 50 ml. glass reaction tube was flushed with nitrogen and was placed in a thermostat at —20° C. To the tube were added 20 mmol. of styrene, 20 mmol. of acrylonitrile, 2 mmol. of ethylboron dichloride and 0.5 mmol. of cobalt trisacetylacetonate in this order, and the mixture was reacted for 3 hours to obtain 3.12 g. of a copolymer.

EXAMPLE 12

A 50 ml. glass reaction tube was flushed with nitrogen and was placed in a thermostat at —20° C. To the tube were added 40 mmol. of styrene, 20 mmol. of acrylonitrile, 2 mmol. of ethylaluminum sesquichloride and 0.5 mmol. of anhydrous chromium chloride in this order, and the mixture was reacted for 3 hours to obtain 3.18 g. of a copolymer.

EXAMPLE 13

Example 12 was repeated, except that anhydrous cobalt chloride was used in place of the chromium chloride, to obtain 3.23 g. of a copolymer.

EXAMPLE 14

Example 12 was repeated, except that anhydrous nickel chloride was used in place of the chromium chloride, to obtain 3.10 g. of a copolymer. The results of elementary analysis of the copolymer were C: 84.62%, H: 7.06% and N: 8.32%, which well coincide with the calculated value for 1:1 alternating copolymer: C: 84.05%, H: 7.04%, N: 8.91%.

EXAMPLE 15

A 50 ml. glass reaction tube was flushed with nitrogen and was placed in a thermostat at 20° C. To the tube were added 3 g. of α-methylstyrene, 2 g. of ethyl acrylate, 2 mmol. of triethylaluminum, 2 mmol. of tin tetrachloride and 0.5 mmol. of cobalt stearate in this order, and the mixture was reacted for 2 hours to obtain 2.09 g. of a copolymer.

EXAMPLE 16

A 50 ml. glass reaction tube was flushed with nitrogen containing 5% of oxygen. To the tube were added at 0° C. 3 ml. of styrene, 2 ml. of methyl acrylate, 2 mmol. of ethylaluminum sesquichloride and 0.5 mmol. of zirconium tetraacetylacetonate in this order, and the mixture was reacted for 3 hours to obtain 1.16 g. of a copolymer.

In the same manner as above, except that biscyclopentadienyltitanium dichloride was used in place of the zirconium tetraacetylacetonate, a copolymer was obtained, as well.

EXAMPLE 17

A 50 ml. glass reaction tube was flushed with nitrogen. To the tube were added at 0° C. 10 ml. of dichloroethane, 5 g. of norbornene, 2 g. of acrylonitrile, 2 mmol. of ethylaluminum sesquichloride, 0.5 mmol. of vanadyl ethoxide dichloride [VO(OEt)Cl₂] and 0.04 mmol. of benzoyl peroxide in this order, and the mixture was reacted for 5 hours to obtain 2.73 g. of a copolymer.

EXAMPLE 18

Twenty mmol. of acrylonitrile and 20 mmol. of methylacrylate were charged into a 50 ml. glass reaction tube in a nitrogen atmosphere at 0° C. To the tube was added 10 mmol. of ethylaluminum sesquichloride (2 mmol./ml. toluene solution), and the mixture was stirred to homogeneity. To this mixture were then added 50 mmol. of styrene and 1 mmol. of n-butoxy orthotitanate [Ti(On-Bu)₄]. After reacting at 0° C. for 2 hours, the reaction mixture was taken out in methanol and was treated to obtain 1.51 g. of a copolymer. The results of elementary analysis of the copolymer were C: 76.40%, H: 7.29%, N: 0.98%, O: 14.43%, and the composition of the copolymer was calculated as styrene 51.1 mole percent, acrylonitrile 6.6 mole percent, and methylacrylate 42.3 mole percent.

EXAMPLE 19

To a 50 ml. glass reaction tube were added in a nitrogen atmosphere at −20° C. 30 mmol. of acrylonitrile, 10 mmol. of methyl acrylate and 15 mmol. of ethylaluminum sesquichloride (7.5 ml. toluene solution). To the tube were further added a mixture comprising 25 mmol. of styrene, 10 mmol. of p-chlorostyrene and 50 mmol. of 5-ethylidene-22-norbornene, and 0.3 mmol. of vanadyl trichloride (0.25 mmol./ml. heptane solution), and the mixture was reacted for 2 hours at −20° C. to obtain 4.10 g. of a copolymer. The results of elementary analysis were C: 77.15%, H: 6.98% N: 4.58%, O: 8.66%, Cl: 3.07% and the iodine value of the copolymer was 9.6. The composition of the copolymer was calculated as styrene 36.8 mole percent, p-chlorostyrene 7.4 mole percent, ethylidene norbornene 3.3 mole percent, acrylonitrile 28.7 mole percent, and methyl acrylate 23.8 mole percent. The sum of (A) group monomer units in the copolymer is 47.5 mole percent and that of (B) group monomer unit is 52.5 mole percent.

What we claim is:
1. A process for producing an alternating copolymer, which comprises contacting at a temperature of from −150° C. to 100° C. at least one group (A) monomer selected from the group consisting of
   (1) a terminally unsaturated olefinic compound having the formula,

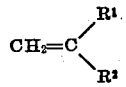

wherein R¹ and R² are individually a hydrogen or halogen atom, a hydrocarbon residue having 1 to 20 carbon atoms selected from the group consisting of alkyl, aryl, aralkyl, alkylaryl and cycloalkyl or a halogen-containing hydrocarbon residue having 1 to 20 carbon atoms selected from the group consisting of halogen-substituted alkyl, aryl, aralkyl, alkylaryl and cycloalkyl,
   (2) an internal olefinic compound having the formula,

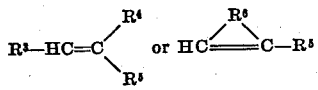

wherein R³ and R⁴ are individually a hydrocarbon residue having 1 to 20 carbon atoms selected from the group consisting of alkyl, aryl, aralkyl, alkylaryl and cycloalkyl or a halogen-containing hydrocarbon residue having 1 to 20 carbon atoms selected from the group consisting of halogen-substituted alkyl, aryl, aralkyl, alkylaryl and cycloalkyl, R⁵ is a hydrogen atom, a hydrocarbon residue having 1 to 20 carbon atoms or a halogen-containing hydrocarbon residue having 1 to 20 carbon atoms; and R⁶ is a cyclic hydrocarbon residue having 1 to 20 carbon atoms or a halogen-containing cyclic hydrocarbon residue having 1 to 20 carbon atoms,
   (3) a non-conjugated, polyenic hydrocarbon or halogen-containing hydrocarbon compound having up to 30 carbon atoms which contains at least one carbon-carbon double bond having at least two hydrogen atoms,
   (4) an acetylenic compound having the formula,

wherein R⁷ is a hydrogen atom, a hydrocarbon residue having 1 to 20 carbon atoms or a halogen-containing hydrocarbon residue having 1 to 20 carbon atoms; and R⁸ is a hydrogen atom or a polymerizable unsaturated hydrocarbon residue having 1 to 20 carbon atoms and having a carbon-carbon double bond or a halogen-substituted group thereof, and
   (5) a carbonyl- or thiocarbonyl-containing non-conjugated unsaturated compound having the formula,

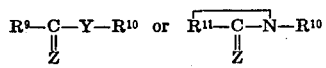

wherein R⁹ is an R¹²—, R¹²O—, R¹²S— or R¹³R¹⁴N— group; Z is an oxygen or sulfur atom; Y is an oxygen or sulfur atom or an —NR¹⁵— group; R¹⁰ is a polymerizable unsaturated hydrocarbon residue having 2 to 20 carbon atoms and having a carbon-carbon double bond or a halogen-substituted group thereof; R¹¹ is a cyclic organic residue having 1 to 20 carbon atoms selected from the group consisting of lactams, dicarboxylic acid amides, dithiocarboxylic acid imides, oxazolidones and alkyleneureas; R¹² is a hydrocarbon residue having 1 to 20 carbon atoms or a halogen-substituted group thereof; and R¹³, R¹⁴ and R¹⁵ are individually a hydrocarbon residue having 1 to 20 carbon atoms or a halogen-substituted group thereof or a hydrogen atom, and at least one group (B) monomer selected from the group consisting of conjugated compounds having the formula,

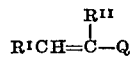

wherein R^I and R^II are individually a hydrocarbon residue having 1 to 20 carbon atoms, a halogen-containing hydrocarbon residue having 1 to 20 carbon atoms, or a halogen or hydrogen atom, at least one of said R^I and R^II being a hydrogen atom; and Q is a nitrile group or a group of the formula,

wherein Y' is a Z'R, Z'Me,

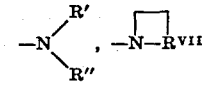

or R group or a halogen atom; Z' is an oxygen or sulfur atom; R, R' and R'' are individually a hydrogen atom or a hydrocarbon or halohydrocarbon radical having 1 to 20 carbon atoms; R^VIII is a saturated divalent organic residue having 1 to 20 carbon atoms; and Me is an ammonium group or represents the monovalent portion of an element of Groups I and II of the Mendeleef's Periodic Table, with a catalyst system prepared by mixing a component (a) with a component (b) in the presence of at least the above-mentioned group (B) conjugated compound, said component (a) being:
   (1) an organo-metallic halide having the formula,

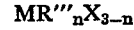

wherein M is aluminum or boron; R''' is a hydrocarbon group having 1 to 20 carbon atoms; X is a halogen atom; and $n$ may take any value from 1 to 2, or a mixture of at least two kinds of compounds having the formulas, (i) $MR'''_n X_{3-n}$,
(ii) $M'R^{IV}_3$, and
(iii) $M''X'_3$ wherein M, M' and M'' are individually aluminum or boron; R''' and $R^{IV}$ are individually a hydrocarbon group having 1 to 20 carbon atoms; X and X' are individually a halogen atom; and $n$ may take any value from 1 to 2, or (2) a complex or an organo-metallic halide component with a coordinated, conjugated compound which is obtained by mixing and contacting (i) an organic compound of a metal of Group IIb, IIIb or IVb of the Mendeleef's Periodic Table of the formula:

$$M'''R^V_n X''_{p-n}$$

wherein M''' is a metal of Group IIb, IIIb or IVb of Mendeleef's Periodic Table; $R^V$ is hydrocarbon group having 1 to 20 carbon atoms; X'' is a halogen; $p$ is the valency of said metal and $n$ is an arbitrary value of 1 to $p$, and (ii) a halide of a metal of Group IIIb or IVb of the Mendeleef's Periodic Table of the formula:

$$M^{IV}X'''_m R^{VI}_{q-m}$$

wherein $M^{IV}$ is a metal of Group IIIb or IVb of Mendeleef's Periodic Table; X''' is a halogen; $R^{VI}$ is a hydrocarbon group having 1 to 20 carbon atoms; $q$ is the valency of said metal and $m$ is an arbitrary value of 1 to $q$, at least one of said (i) and (ii) being a compound of aluminum or boron in the presence of the aforesaid conjugated component (B); and said component (b) being a compound consisting of a transition metal selected from the group consisting of titanium, zirconium, vanadium, chromium, molybdenum, tungsten, iron, cobalt, nickel, palladium, rhodium and platinum and at least one member selected from the group consisting of a halogen atom, an oxygen atom, hydrocarbyl, alkoxy, β-diketo and acyloxy groups, said alternating copolymer being alternating with respect to the group (A) monomers and the group (B) monomers in which each group (A) monomer and each group (B) monomer are alternately bonded to each other and each monomer belonging to one group is bonded to monomers belonging to the other group.

2. A process according to claim 1, wherein the group (A) monomer has an $e$ value, in the Q—e scheme defined by Price-Alfrey, of 0.5 or less.

3. A process according to claim 1, wherein the group (B) monomer is a conjugated compound selected from the group consisting of acrylonitrile, acrylates, acrylamides, N-substituted acrylamides, acrylic acid halides, acrylic acid, acrylic acid salts, acrolein and vinylketones, and said compounds in which the hydrogen atom in the α- or β-position has been substituted by a halogen atom, a hydrocarbon group or a halogen-containing hydrocarbon group.

4. A process according to claim 1, wherein the alternating copolymer is a multi-copolymer composed of up to 5 kinds of the group (A) and (B) monomers and comprising one or more group (A) monomers and one or more group (B) monomers, which copolymer is alternating with respect to the group (A) and (B) monomers and in which the monomer or monomers belonging to one group have necessarily been bonded only to the monomer or monomers belonging to the other group.

5. A process according to claim 1, wherein the catalyst component (a) is one member selected from the group consisting of alkylaluminum halides, alkylboron halides and mixtures obtained by mixing trialkylaluminum with tin tetrahalide in the presence of the group (A) monomer.

6. A process according to claim 1, wherein the catalyst is the combination of an alkylaluminum halide and a vanadium compound having at least one member selected from the group consisting of halogen atoms and alkoxy and acylacetonyl groups, or is the combination of an alkylboron halide and a cobalt trisacetylacetonate.

7. A process according to claim 1, wherein the aluminum or boron compound in the catalyst component (a) is used in a proportion of 0.001–1 mole per mole of the group (A) conjugated compound.

8. A process according to claim 1, wherein the catalyst component (b) is used in a proportion of 0.001–10 moles per mole of the catalyst component (a).

9. A process according to claim 1, wherein the catalyst component (b) is used in a proportion of 0.01–1 mole per mole of the catalyst component (a).

10. A process according to claim 1, wherein the aluminum or boron compound is used in an amount sufficient to bring about no homopolymerization of the group (B) monomer.

11. A process according to claim 1, wherein the copolymerization reaction is effected under such conditions that no homopolymerization of the group (A) and/or (B) monomers is brought about.

12. A process according to claim 1, wherein an organic peroxide or oxygen is added in a proportion of 0.01–100 moles percent based on the amount of the catalyst.

13. A process according to claim 1, wherein the compound belonging to (5) of the group (A) monomer is an O— or S— unsaturated compound selected from the group consisting of carboxylic, thiocarboxylic, thioncarboxylic and dithiocarboxylic acid esters, carbonates, thiolcarbonates, thioncarbonates, dithiocarbonates, trithiocarbonates, carbamates, thiolcarbamates, thioncarbamates and dithiocarbamates, or is an N-unsaturated compound selected from the group consisting of carboxylic and thiolcarboxylic acid amides, carbamates, thiolcarbamates, thioncarbamates, dithiocarbamates, urea compounds and thiourea compounds.

References Cited

UNITED STATES PATENTS

| | | | |
|---|---|---|---|
| 3,127,380 | 3/1964 | Welch | 260—85.5 |
| 3,159,607 | 12/1964 | D'Alelio | 260—82.1 |
| 3,169,079 | 2/1965 | Ferington et al. | 117—124 |
| 3,183,217 | 5/1965 | Serniuk | 260—85.5 |
| 3,326,870 | 6/1967 | Nakaguchi et al. | 260—85.5 |
| 3,492,277 | 1/1970 | Clark | 260—88.1 |

WILLIAM H. SHORT, Primary Examiner

L. L. LEE, Assistant Examiner

U.S. Cl. X.R.

260—63 R, 67 UA, 73 R, 80.5, 80.7, 85.5 ES, 85.5 HC, 85.5 XA, 86.1 N, 86.3, 86.7